Feb. 8, 1949.  M. FISCHMAN  2,461,110
PULSE GENERATOR
Filed March 8, 1945
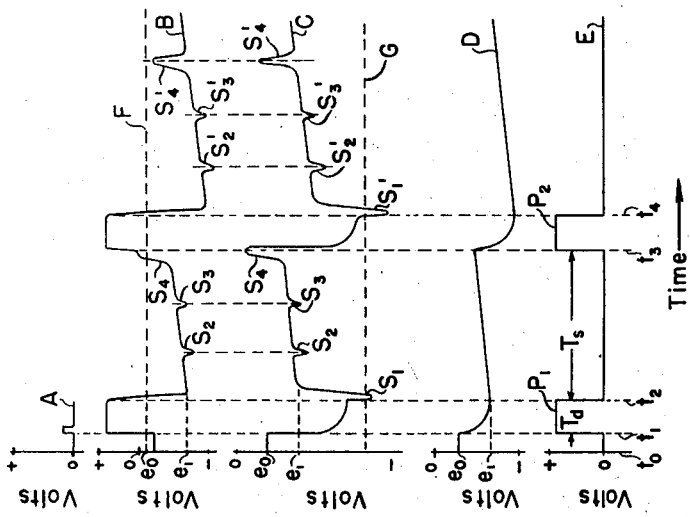
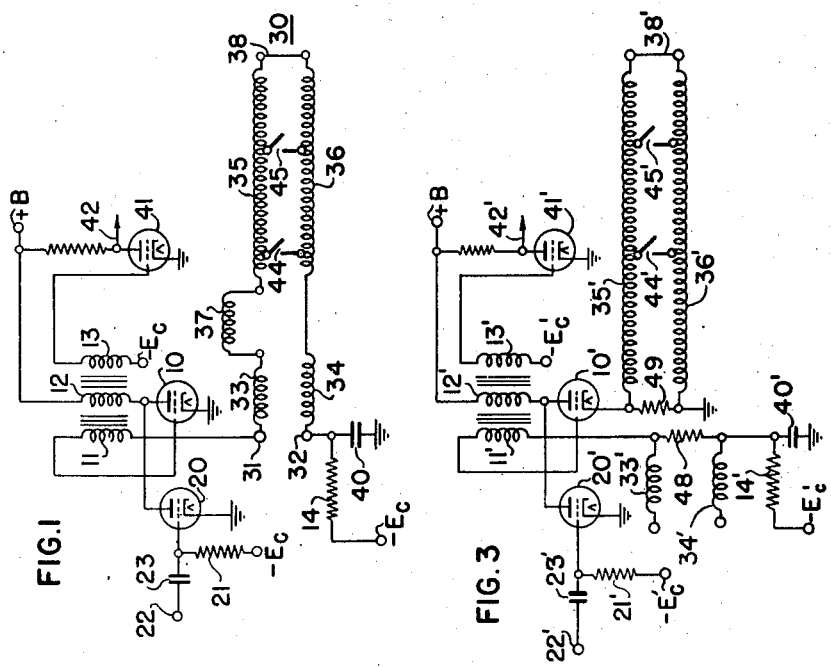
INVENTOR.
MARTIN FISCHMAN
BY *Harry C. Page*
ATTORNEY Patented Feb. 8, 1949

2,461,110

UNITED STATES PATENT OFFICE 2,461,110

PULSE GENERATOR

Martin Fischman, Brooklyn, N. Y., assignor, by mesne assignments, to Hazeltine Research, Inc., Chicago, Ill., a corporation of Illinois Application March 8, 1945, Serial No. 581,655

15 Claims. (Cl. 250—27)

1

This invention is directed to pulse generators for generating a plurality of time-spaced pulses having two characteristic time intervals, one corresponding to the pulse duration and the other corresponding to the separation of succeeding pulses. While the invention may be utilized in a variety of circuit arrangements to produce such pulses, it is especially suited for use in arrangements where heretofore blocking oscillators have been employed and will be particularly described in that connection.

Conventional blocking oscillators employed to generate time-spaced pulses usually comprise a vacuum tube included in a highly regenerative circuit. A condenser and a high value leak resistor associated with the control electrode of the tube constitute a time-constant circuit in the input circuit of the oscillator which determines, to a large extent, the characteristic time intervals of the generated pulses. When oscillations are initiated, they build up rapidly and drive the control electrode of the tube positive, causing grid current rectification. This rectification occurs within a single cycle of the oscillations. It charges the condenser in the input circuit and establishes a blocking voltage which blocks the tube. The condenser is then slowly discharged through the leak resistor, reducing the value of the blocking voltage. When this voltage has decreased to less than the cutoff value of the tube, the tube is again conductive and the next pulse is generated.

While such prior art generators have been widely used, they are subject to certain inherent limitations which may be undesirable in particular installations. For example, the duration of the generated pulses corresponds to the time interval required for the blocking voltage to be developed. This, in turn, is determined by the grid current rectification phenomenon which varies with the operating characteristics of the regenerator tube. Also, the time separation of the generated pulses, which corresponds to the intervals when the circuit is blocked, may tend to vary with operating characteristics of the tube and the regenerative circuit. In other words, with such an arrangement the characteristic time intervals of the generated pulses may undesirably vary with variations in the operating characteristics of the blocking oscillator.

It is an object of the present invention, therefore, to provide a pulse generator which substantially avoids one or more of the aforementioned limitations of prior art arrangements.

It is another object of the invention to provide an improved pulse generator for generating a plurality of pulses having a desired pulse duration and separation.

It is still another object of the invention to provide an improved pulse generator which, when

2 excited, generates a predetermined plurality of pulses having a desired pulse duration and separation.

In accordance with the invention, a generator for generating a plurality of pulses having two characteristic time intervals corresponding, respectively, to pulse duration and pulse separation comprises an electron-discharge means and a first time-delay transmission line coupled to the electron-discharge means. This line is responsive to a conductance variation of the electron-discharge means in one sense for applying to the electron-discharge means a first delayed control signal which is effective to vary the conductance thereof in an opposite sense and complete a cycle of conductance variation. The time delay of the first line is such that the first control signal is delayed with reference to the aforesaid conductance variation in one sense by an interval equal to a desired value of one of the characteristic time intervals of the generated pulses. The generator also includes a second time-delay transmission line coupled to the electron-discharge means. The second line is responsive to a conductance variation of the electron-discharge means for applying to the electron-discharge means a second delayed control signal which is effective to vary the conductance thereof in the aforesaid one sense. The time delay of the second line is such that the second control signal is delayed with reference to the first control signal by an interval equal to a desired value of the other of the characteristic time intervals of the generated pulses, whereby the conductance of the electron-discharge means is cyclically varied at spaced intervals to generate output pulses having a desired duration and time separation.

For a better understanding of the present invention, together with other and further objects thereof, reference is had to the following description taken in connection with the accompanying drawing, and its scope will be pointed out in the appended claims.

In the drawing, Fig. 1 is a schematic representation of a pulse generator in accordance with the invention; Fig. 2 includes a series of idealized graphs utilized in explaining the operation of the Fig. 1 arrangement; while Fig. 3 represents a modification of the Fig. 1 arrangement.

Referring now more particularly to Fig. 1, there is represented a keyed pulse generator which, when keyed into operation, generates a predetermined plurality of time-spaced pulses. These pulses have two characteristic time intervals corresponding, respectively, to pulse duration and pulse separation and the generator arrangement is such that these characteristic time intervals have desired values. The arrangement comprises an electron-discharge means provided by a triode vacuum tube 10 having an anode, a cathode and a control electrode. The cathode of tube 10 is grounded and the anode thereof is coupled by way of a central winding 12 of a pulse transformer to a source of space current, indicated +B. A bias potential of sufficient magnitude normally to maintain tube 10 in a nonconductive condition is applied to the control electrode thereof from a source, indicated —Ec, through a resistor 14, a composite time-delay transmission line arrangement to be described presently, and a second winding 11 of the pulse transformer. The coupling between windings 11 and 12 is adjusted to provide regenerative feedback from the output to the input circuit of tube 10 in a manner analogous to that of a conventional single-tube blocking oscillator.

The generator includes means for applying a keying signal to the control electrode of tube 10 to render the tube conductive, that is, to effect a conductance variation thereof in one sense to initiate the generation of an output pulse. This means comprises a second triode vacuum tube 20 having an output circuit connected in parallel with that of regenerator tube 10. An operating bias potential is supplied to the control electrode of tube 20 from a source —Ec by way of a resistor 21. Keying signals to control the generator and time the generation of output pulses may be applied to an input terminal 22 which is coupled through a condenser 23 to the control electrode of tube 20.

The generator further includes a first and a second reflecting time-delay transmission line for accurately determining the two above-mentioned characteristic time intervals of the generated pulses. The first line is responsive to the aforementioned conductance variation of tube 10 in one sense for applying thereto a first delayed control signal effective to vary the conductance of tube 10 in an opposite sense and complete a cycle of conductance variation. The time delay of this line is such that the first control signal is delayed with reference to the aforesaid conductance variation of tube 10 in one sense by an interval equal to a desired value of one of the characteristic time intervals of the generated pulses, specifically, the pulse duration. The second line is likewise responsive to a conductance variation of tube 10 for applying thereto a second delayed control signal which is effective to vary the conductance of tube 10 in the aforementioned one sense. The time delay of the second line is such that the second control signal is delayed with respect to the first by an interval equal to a desired value of the other of the characteristic time intervals, namely the pulse separation, whereby the conductance of tube 10 is cyclically varied at spaced intervals to generate output pulses having a desired duration and time separation. While discrete and separate first and second transmission lines may be utilized, in the embodiment of the invention under consideration a single composite transmission-line arrangement 30 is employed, this unit being constructed effectively to comprise two delay lines as will be made clear presently.

Unit 30 has input terminals 31 and 32 through which the pair of lines effectively included therein are coupled to a single pair of the electrodes of tube 10. In particular, the line arrangement is coupled between the cathode and control electrode of tube 10. It includes a first line section provided by a pair of elongated or distributed windings 33 and 34 wound about a common core structure (not shown) to have a uniformly distributed capacitance therebetween and a second line section provided by distributed windings 35 and 36, likewise wound about the common core structure to have a uniformly distributed capacitance therebetween. Preferably, windings 33, 34, 35 and 36 are so associated with respect to the common core structure that the two line sections have the same inductance and capacitance per unit length. In other words, the characteristic impedances of the two line sections are identical and pheferably are approximately equal to the control electrode-cathode impedance of tube 10. An additional winding or inductor 37 connects the line sections in cascade. Winding 37 is so selected that the adjacent end of line section 33, 34 has an impedance termination of such magnitude as to effect a predetermined partial reflection with one polarity of a transient signal of given polarity applied to input terminals 31, 32. On the other hand, the remote end of line section 35, 36 is provided with an impedance termination of such magnitude as to effect a substantially complete reflection of the applied transient signal but with a polarity opposite to that of the reflection obtained from the first line section. More specifically, winding 37 causes line section 33, 34 to be terminated in an impedance which is greater than its characteristic impedance so that the signal obtained from partial reflection in this line section has the same polarity as the applied signal. On the other hand, the remote terminals of line section 35, 36 are short-circuited, as indicated at 38, to effect complete reflection but with a polarity reversal of an applied signal. Furthermore, windings 33 and 34, 35 and 36 are so selected that a first control signal obtained by virtue of the partial reflection at winding 37 and a second control signal obtained from the complete reflection at short circuit 38 have the time delays described above.

The time delay of a reflecting transmission line of the type described may be shown to be approximately equal to twice the geometric mean of its total inductance and total capacitance. From this relationship, it is noted that the time delays of line sections 33, 34 and 35, 36 may be adjusted to desired values through appropriate selection of the distributed windings which make up the individual sections. The switches 44 and 45, bridged across spaced points of line section 35, 36 are additional short-circuiting devices through which the time delay of this section and the time separation of the generated pulses may be adjusted.

A condenser 40 is included in the control-electrode circuit of tube 10 to develop a holding voltage for blocking the tube in response to a predetermined plurality of conductance-variation cycles.

A third winding 13 of the pulse transformer applies the generated pulses from the output circuit of tube 10 to the input circuit of a triode vacuum-tube repeater 41. The repeated pulses may be supplied to a suitable utilizing circuit, as indicated by connection 42 to the output circuit of tube 41.

In considering the operation of the described pulse generator, it will be assumed that the circuit parameters are selected so that a pair of time-spaced pulses having a desired pulse duration and separation are generated each time the generator is keyed into operation. The curves of Fig. 2 demonstrate the response of the generator to an applied keying signal. In this figure, the keying signal is represented by curve A, while curves B, C and D, respectively, represent the potentials to ground of the control electrode of tube 10, terminal 31 of unit 30, and the high-potential terminal of condenser 40. Curve E illustrates the generated output pulses and broken-line curves F and G indicate critical voltage levels in the generator circuit.

At a time $t_0$ immediately preceding the keying signal, the generator is in its quiescent state. That is to say, tube 10 is nonconductive and the potential level of its control electrode, unit 30 and the high-potential terminal of condenser 40 are at the steady-state condition $e_0$ established by potential source $-E_c$ coupled to the control electrode of the tube. The keying signal, a unidirectional pulse of positive polarity, is supplied to input terminal 22 at time $t_1$. After translation through repeater 20 and windings 11, 12 of the pulse transformer, the keying signal is applied with positive polarity to the control electrode of tube 10 to effect a conductance variation thereof in one sense, that is, to overcome the bias potential and render the tube conductive. Due to the regenerative feedback of windings 11 and 12, the control electrode of tube 10 is rapidly driven in a positive direction, causing the tube to become highly conductive and producing control electrode-cathode current.

Current flow in the control electrode-cathode circuit of tube 10 has two significant effects. It applies a transient signal or impulse of negative polarity to input terminals 31, 32 of unit 30 and also increases the charge on condenser 40. The transient signal applied to unit 30 travels down the line but is partially reflected at the far end of first line section 33, 34. The partial reflection, resulting from an impedance termination which is greater than the characteristic impedance of this line section, has the same polarity as the applied or incident transient signal. The impedance discontinuity of line 30 at the junction of sections 33, 34 and 35, 36 has such magnitude that the reflected signal has sufficient amplitude to be utilized as a control signal to bias tube 10 back to its normal non-conductive condition, completing the first conductance-variation cycle. This first control signal is represented by the negative-polarity pulse $S_1$ of curve C. Its amplitude level is such that the potential level of line terminal 31 exceeds the value, indicated by broken-line G, required to bias the regenerator tube to anode current cutoff. In view of the time delay of line section 33, 34, control signal $S_1$ is applied to tube 10 at time $t_2$, such that the interval $t_1-t_2$ is equal to the desired pulse duration. Current flow in the anode-cathode circuit of the tube during this interval $t_1-t_2$ induces a generated pulse in the input circuit of repeater 41. The generated pulse appears at output connection 42, as represented by pulse $P_1$ of curve E having the preselected duration $T_d$.

With tube 10 returned to its normal non-conductive condition at the time $t_2$, after the first output pulse $P_1$ has been produced, the potentials of its control electrode, terminal 31 of line 30 and the high-potential terminal of condenser 40 are at a level $e_1$, corresponding to the charge condition established on condenser 40 by control electrode-cathode current flow during the time interval $t_1-t_2$. As the charge of condenser 40 tends to leak away through resistor 14, the potential levels of the control electrode of tube 10, terminal 31 of line 30 and the condenser itself tend to approach the steady-bias level $e_0$ in an exponential manner, as indicated by curves B, C and D during the time interval $t_2-t_3$. The pulse variations $S_2$ $S_3$ of curve C and the corresponding variations of curve B in this interval represent successive reflections of the first control signal $S_1$ which effectively constitute energy trapped within line section 33, 34 since that line section is not terminated in its characteristic impedance at either end. However, these multiple reflections have no material effect on the generator operation as they are of negative polarity and occur during an operating interval when tube 10 is in a nonconductive state.

The transient signal applied to unit 30 which gave rise to first control signal $S_1$ due to the partial reflection from line section 33, 34 traverses the remaining line section 35, 36 and encounters the short-circuited termination 38. A complete reflection with a polarity reversal occurs at the short circuit producing a second control pulse of positive polarity, represented at $S_4$ in curves B and C. The time delay of line section 35, 36 is such that the second control signal $S_4$ is applied to tube 10 at time $t_3$ such that the time interval $t_2-t_3$ corresponds to the desired separation $T_s$ of the generated pulses. Also, the line characteristics and operating conditions are selected so that the amplitude of control pulse $S_4$ is sufficient to raise the control-electrode voltage of tube 10 to a level exceeding its firing level, designated by broken-line curve F. The second control signal $S_4$ is, therefore, effective to render tube 10 conductive and initiate a second cycle of conductance variation to generate the next output pulse $P_2$.

The second cycle of conductance variation is completed in response to a control signal $S_1'$ obtained by partial reflection from line section 33, 34 in the described manner. Control signal $S_1'$ is so delayed that the second generated pulse $P_2$ of curve E has a duration $t_3-t_4$ which is equal to that of the first pulse $P_1$. Condenser 40 receives an additional charge increment during the generation of the second pulse and increases the negative-potential level of terminal 31 of line 30 so that the signal $S_4'$, reflected at the short-circuited end 38 of line 30, fails to raise the control electrode of tube 10 to its firing level, as shown in curve F. Therefore, the generator is returned to its quiescent condition and the potential level in the control-electrode circuit gradually decreases to its steady-state value $e_0$ obtained at the initial time $t_0$. Thereafter, a succeeding keying pulse may trigger the generator to produce a similar pair of time-spaced pulses having a desired duration $T_d$ and a desired separation $T_s$. To assure this operation, the spacing of the keying signals should be long with reference to the discharge time constant of condenser 40. The pulses $S_2'$ and $S_3'$ of curves B and C are reflections of pulse $S_1'$ and have no appreciable effect on the described operation of the generator.

The arrangement of Fig. 3 is generally similar to that of Fig. 1, corresponding components thereof being identified by the same reference characters primed. In Fig. 3, however, the control signals for producing cyclical conductance variations of tube 10' are derived through separate and discrete time-delay transmission lines. The first line is coupled between the control electrode and ground and is provided by a pair of windings 33' and 34' which are open-circuited at one end. At the opposite end, this line is terminated in an impedance 48, selected in conjunction with the impedance of the remaining portion of the control electrode-cathode circuit to terminate line 33', 34' in its characteristic impedance. This first line is utilized to derive the first control signal for returning tube 10 to its nonconductive condition after it has been rendered conductive to generate a pulse. Its delay is similar to that of line section 33, 34 of the Fig. 1 arrangement.

The second line is coupled between cathode and ground, being provided by a pair of windings 35', 36'. Since this line is coupled in the cathode circuit, it is constructed, preferably, to have a low characteristic impedance. The line is short-circuited at one end by the short-circuiting device 38' and is terminated at its input end in an impedance 49. Impedance 49 is selected to terminate the second line in its characteristic impedance. This second line functions in a similar manner to that of line section 35, 36 of the Fig. 1 arrangement, deriving a control signal to render tube 10' conductive. However, since this line is directly coupled to the cathode electrode of the tube, its delay must be equal to the overall delay of line 30 of the Fig. 1 arrangement if the generated pulses in the two cases are to have the same time separation.

In either of the described generator arrangements, condenser 40 and the operating potentials may be appropriately selected so that in response to a single keying operation the generator produces more than two time-spaced pulses.

In each illustrated embodiment of the invention simulated or artificial time-delay transmission lines have been disclosed. It will be understood, however, that this is not a limitation of either arrangement, other forms of transmission lines being equally suitable. As utilized throughout this specification and in the appended claims the term "time-delay transmission line" is intended to define a time-delay network including series-impedance elements of one type and shunt-impedance elements of another type. In the usual case, inductors are utilized as the series elements while condensers constitute the shunt elements. Frequently the condensers are comprised in whole or in part of distributed capacitance effects of the inductors.

In one embodiment of the Fig. 1 arrangement found to have practical utility the following circuit elements were employed:

Tubes 10, 20, 41_____ Type 6SN7
Pulse transformer 11,
  12, 13_____ G. E. 1C35G82 (General Electric Company)
Windings 11 and 12_____ 100 turns each
Winding 13_____ 50 turns
Transmission line 30____ Double - wound type line of Number 31 Formex wire on 5 mm. glass tubing
Characteristic impedance_____ 500 ohms
Winding 37_____ 80 microhenries choke
Condenser 40_____ .0035 microfarad
Resistor 14_____ 27,000 ohms
Resistor 21_____ 10,000 ohms
Condenser 23_____ .001 microfarad
Anode-cathode excitation potential +B_____ 300 volts
Bias potential source Ec__ —30 volts While there have been described what are at present considered to be the preferred embodiments of this invention, it will be obvious to those skilled in the art that various changes and modifications may be made therein without departing from the invention, that is, therefore, aimed in the appended claims to cover all such changes and modifications as fall within the true spirit and scope of the invention.

What is claimed is:

1. A generator for generating a plurality of pulses having two characteristic time intervals corresponding respectively to pulse duration and pulse separation comprising, electron-discharge means, a first time-delay transmission line coupled to said electron-discharge means and responsive to a conductance variation of said electron-discharge means in one sense for applying to said electron-discharge means a first delayed control signal effective to vary the conductance thereof in an opposite sense and complete a cycle of conductance variation, the time delay of said first line being such that said first control signal is delayed with reference to said conductance variation in said one sense by an interval equal to a desired value of one of said characteristic time intervals, and a second time-delay transmission line coupled to said electron-discharge means and responsive to a conductance variation of said electron-discharge means for applying to said electron-discharge means a second delayed control signal effective to vary the conductance thereof in said one sense, the time delay of said second line being such that said second control signal is delayed with reference to said first control signal by an interval equal to a desired value of the other of said characteristic time intervals, whereby the conductance of said electron-discharge means is cyclically varied at spaced intervals to generate output pulses having a desired duration and time separation.

2. A generator for generating a plurality of pulses having two characteristic time intervals corresponding respectively to pulse duration and pulse separation comprising, electron-discharge means, a first time-delay transmission line coupled to said electron-discharge means and responsive to a conductance variation of said electron-discharge means in one sense for applying to said electron-discharge means a first delayed control signal effective to vary the conductance thereof in an opposite sense and complete a cycle of conductance variation, the time delay of said first line being such that said first control signal is delayed with reference to said conductance variation in one sense by an interval equal to the desired duration of the generated pulses, and a second time-delay transmission line coupled to said electron-discharge means and responsive to a conductance variation of said electron-discharge means for applying to said electron-discharge means a second delayed control signal effective to vary the conductance thereof in said one sense, the time delay of said second line being such that said second control signal is delayed with reference to said first control signal by an interval equal to the desired time separation of the generated pulses, whereby the conductance of said electron-discharge means is cyclically varied at spaced intervals to generate output pulses having said desired duration and time separation.

3. A generator for generating a plurality of pulses having two characteristic time intervals corresponding respectively to pulse duration and pulse separation comprising, electron-discharge means, a first time-delay transmission line coupled to said electron-discharge means and responsive to a conductance variation of said electron-discharge means in one sense for applying to said electron-discharge means a first delayed control signal effective to vary the conductance thereof in an opposite sense and complete a cycle of conductance variation, the time delay of said first line being such that said first control signal is delayed with reference to said conductance variation in said one sense by an interval equal to a desired value of one of said characteristic time intervals, and a second time-delay transmission on line coupled to said electron-discharge means and responsive to said conductance variation of said electron-discharge means in said one sense for applying to said electron-discharge means a second delayed control signal effective to vary the conductance thereof in said one sense, the time delay of said second line being such that said second control signal is delayed with reference to said first control signal by an interval equal to a desired value of the other of said characteristic time intervals, whereby the conductance of said electron-discharge means is cyclically varied at spaced intervals to generate output pulses having a desired duration and time separation.

4. A generator for generating a plurality of pulses having two characteristic time intervals corresponding respectively to pulse duration and pulse separation comprising, electron-discharge means, first reflecting time-delay transmission line coupled to said electron-discharge means and responsive to a conductance variation of said electron-discharge means in one sense for applying to said electron-discharge means a first delayed control signal effective to vary the conductance thereof in an opposite sense and complete a cycle of conductance variation, the time delay of said first line being such that said first control signal is delayed with reference to said conductance variation in said one sense by an interval equal to a desired value of one of said characteristic time intervals, and a second reflecting time-delay transmission line coupled to said electron-discharge means and responsive to a conductance variation of said electron-discharge means for applying to said electron-discharge means a second delayed control signal effective to vary the conductance thereof in said one sense, the time delay of said second line being such that said second control signal is delayed with reference to said first control signal by an interval equal to a desired value of the other of said characteristic time intervals, whereby the conductance of said electron-discharge means is cyclically varied at spaced intervals to generate output pulses having a desired duration and time separation.

5. A generator for generating a plurality of pulses having two characteristic time intervals corresponding respectively to pulse duration and pulse separation comprising, electron-discharge means including a plurality of electrodes, a first time-delay transmission line coupled between a pair of said electrodes and responsive to a conductance variation of said electron-discharge means in one sense for applying to said electron-discharge means a first delayed control signal effective to vary the conductance thereof in an opposite sense and complete a cycle of conductance variation, the time delay of said first line being such that said first control signal is delayed with reference to said conductance variation in said one sense by an interval equal to a desired value of one of said characteristic time intervals, and a second time-delay transmission line coupled between a pair of said electrodes and responsive to a conductance variation of said electron-discharge means for applying to said electron-discharge means a second delayed control signal effective to vary the conductance thereof in said one sense, the time delay of said second line being such that said second control signal is delayed with reference to said first control signal by an interval equal to a desired value of the other of said characteristic time intervals, whereby the conductance of said electron-discharge means is cyclically varied at spaced intervals to generate output pulses having a desired duration and time separation.

6. A generator for generating a plurality of pulses having two characteristic time intervals corresponding respectively to pulse duration and pulse separation comprising, electron-discharge means including a plurality of electrodes, a first time-delay transmission line coupled between a pair of said electrodes and responsive to a conductance variation of said electron-discharge means in one sense for applying to said electron-discharge means a first delayed control signal effective to vary the conductance thereof in an opposite sense and complete a cycle of conductance variation, the time delay of said first line being such that said first control signal is delayed with reference to said conductance variation in said one sense by an interval equal to a desired value of one of said characteristic time intervals, and a second time-delay transmission line coupled between said pair of electrodes and responsive to a conductance variation of said electron-discharge means for applying to said electron-discharge means a second delayed control signal effective to vary the conductance thereof in said one sense, the time delay of said second line being such that said second control signal is delayed with reference to said first control signal by an interval equal to a desired value of the other of said characteristic time intervals, whereby the conductance of said electron-discharge means is cyclically varied at spaced intervals to generate output pulses having a desired duration and time separation.

7. A generator for generating a plurality of pulses having two characteristic time intervals corresponding espectively to pulse duration and pulse separation comprising, electron-discharge means including an anode, a cathode and a control electrode, a first time-delay transmission line coupled between said cathode and control electrode and responsive to a conductance variation of said electron-discharge means in one sense for applying to said electron-discharge means a first delayed control signal effective to vary the conductance thereof in an opposite sense and complete a cycle of conductance variation, the time delay of said first line being such that said first control signal is delayed with reference to said conductance variation in said one sense by an interval equal to a desired value of one of said characteristic time intervals, and a second time-delay transmission line coupled between said cathode and control electrode and responsive to a conductance variation of said electron-discharge means for applying to said electron-discharge means a second delayed control signal effective to vary the conductance thereof in said one sense, the time delay of said second line being such that said second control signal is delayed with reference to said first control signal by an interval equal to a desired value of the other of said characteristic time intervals, whereby the conductance of said electron-discharge means is cyclically varied at spaced intervals to generate output pulses having a desired duration and time separation.

8. A generator for generating a plurality of pulses having two characteristic time intervals corresponding respectively to pulse duration and pulse separation comprising, electron-discharge means, a first time-delay transmission line of a predetermined characteristic impedance having an impedance termination at one end which is substantially greater than said characteristic impedance, means for coupling the other end of said first line to said electron-discharge means so that in response to a conductance variation of said electron-discharge means in one sense said first line applies thereto a first delayed control signal effective to vary the conductance thereof in an opposite sense and complete a cycle of conductance variation, the time delay of said first line being such that said first control signal is delayed with reference to said conductance variation in said one sense by an interval equal to a desired value of one of said characteristic time intervals, a second time-delay transmission line of a predetermined characteristic impedance having an impedance termination at one end which is substantially less than said characteristic impedance, and means for coupling the other end of said second line to said electron-discharge means so that in response to a conductance variation of said electron-discharge means said second line applies thereto a second delayed control signal effective to vary the conductance thereof in said one sense, the time delay of said second line being such that said second control signal is delayed with reference to said first control signal by an interval equal to a desired value of the other of said characteristic time intervals, whereby the conductance of said electron-discharge means is cyclically varied at spaced intervals to generate output pulses having a desired duration and time separation.

9. A generator for generating a plurality of pulses having two characteristic time intervals corresponding respectively to pulse duration and pulse separation comprising, electron-discharge means, a first time-delay transmission line of a predetermined characteristic impedance open-circuited at one end, means for coupling the other end of said first line to said electron-discharge means so that in response to a conductance variation of said electron-discharge means in one sense said first line applies thereto a first delayed control signal effective to vary the conductance thereof in an opposite sense and complete a cycle of conductance variation, the time delay of said first line being such that said first control signal is delayed with reference to said conductance variation in said one sense by an interval equal to a desired value of one of said characteristic time intervals, a second time-delay transmission line of a predetermined characteristic impedance short-circuited at one end, and means for coupling the other end of said second line to said electron-discharge means so that in response to a conductance variation of said electron-discharge means said second line applies thereto a second delayed control signal effective to vary the conductance thereof in said one sense, the time delay of said second line being such that said second control signal is delayed with reference to said first control signal by an interval equal to a desired value of the other of said characteristic time intervals, whereby the conductance of said electron-discharge means is cyclically varied at spaced intervals to generate output pulses having a desired duration and time separation.

10. A generator for generating a plurality of pulses having two characteristic time intervals corresponding respectively to pulse duration and pulse separation comprising, electron-discharge means including a plurality of electrodes, a time-delay transmission line including a first line section having an impedance termination at one end of such magnitude as to effect a predetermined partial reflection with one polarity of an applied transient signal of predetermined polarity and including a second line section connected in cascade with said one end of said first section and having an impedance termination of such magnitude as to effect a substantially complete reflection of said transient signal but with a polarity opposite said one polarity, and means for coupling said transmission line to a pair of said electrodes so that in response to a conductance variation of said electron-discharge means in one sense, said first line section applies thereto a first delayed control signal of a given polarity effective to vary the conductance thereof in an opposite sense to complete a cycle of conductance variation and said second line section applies to said electron-discharge means a second delayed control signal of opposite polarity effective to vary the conductance thereof in said one sense, the time delay of said first section being such that said first control signal is delayed with reference to said conductance variation in said one sense by an interval equal to a desired value of one of said characteristic time intervals and the time delay of said second section being such that said second control signal is delayed with reference to said first control signal by an interval equal to a desired value of the other of said characteristic time intervals, whereby the conductance of said electron-discharge means is cyclically varied at spaced intervals to generate output pulses having a desired duration and time separation.

11. A generator for generating a plurality of pulses having two characteristic time intervals corresponding respectively to pulse duration and pulse separation comprising, electron-discharge means including a plurality of electrodes, a time-delay transmission line including a first line section of a given characteristic impedance having an impedance termination at one end exceeding said characteristic impedance by a predetermined amount to effect a predetermined partial reflection of an applied transient signal and including a second line section connected in cascade with said one end of said first section and short-circuited to effect a substantially complete reflection of said transient signal, and means for coupling said transmission line to a pair of said electrodes so that in response to a conductance variation of said electron-discharge means in one sense, said first line section applies thereto a first delayed control signal of a given polarity effective to vary the conductance thereof in an opposite sense to complete a cycle of conductance variation and second line section applies to said electron-discharge means a second delayed control signal of opposite polarity effective to vary the conductance thereof in said one sense, the time delay of said first section being such that said first control signal is delayed with reference to said conductance variation in said one sense by an interval equal to a desired value of one of said characteristic time intervals and the time delay of said second section being such that said second control signal is delayed with reference to said first control signal by an interval equal to a desired value of the other of said characteristic time intervals, whereby the conductance of said electron-discharge means is cyclically varied at spaced intervals to generate output pulses having a desired duration and time separation.

12. A generator for generating a plurality of pulses having two characteristic time intervals corresponding respectively to pulse duration and pulse separation comprising, electron-discharge means including a plurality of electrodes, a time-delay transmission line including a first line section of a given characteristic impedance having an impedance termination at one end exceeding said characteristic impedance by a predetermined amount to effect a predetermined partial reflection of an applied transient signal and including a second line section of said given characteristic impedance connected in cascade with said one end of said first section and short-circuited to effect a substantially complete reflection of said transient signal, and means for coupling said transmission line to a pair of said electrodes so that in response to a conductance variation of said electron-discharge means in one sense, said first line section applies thereto a first delayed control signal of a given polarity effective to vary the conductance thereof in an opposite sense to complete a cycle of conductance variation and said second line section applies to said electron-discharge means a second delayed control signal of opposite polarity effective to vary the conductance thereof in said one sense, the time delay of said first section being such that said first control signal is delayed with reference to said conductance variation in said one sense by an interval equal to a desired value of one of said characteristic time intervals and the time delay of said second section being such that said second control signal is delayed with reference to said first control signal by an interval equal to a desired value of the other of said characteristic time intervals, whereby the conductance of said electron-discharge means is cyclically varied at spaced intervals to generate output pulses having a desired duration and time separation.

13. A generator for generating a plurality of pulses having two characteristic time intervals corresponding respectively to pulse duration and pulse separation comprising, electron-discharge means, a first time-delay transmission line coupled to said electron-discharge means and responsive to a conductance variation of said electron-discharge means in one sense for applying to said electron-discharge means a first delayed control signal effective to vary the conductance thereof in an opposite sense and complete a cycle of conductance variation, the time delay of said first line being such that said first control signal is delayed with reference to said conductance variation in said one sense by an interval equal to a desired value of one of said characteristic time intervals, a second time-delay transmission line coupled to said electron-discharge means and responsive to a conductance variation of said electron-discharge means for applying to said electron-discharge means a second delayed control signal effective to vary the conductance thereof in said one sense, the time delay of said second line being such that said second control signal is delayed with reference to said first control signal by an interval equal to a desired value of the other of said characteristic time intervals, and means responsive to a predetermined plurality of said cycles of conductance variation for blocking said electron-discharge means, whereby the conductance of said electron-discharge means is cyclically varied at spaced intervals to generate a predetermined plurality of output pulses having a desired duration and time separation.

14. A generator for generating a plurality of pulses having two characteristic time intervals corresponding respectively to pulse duration and pulse separation comprising, electron-discharge means including an anode, a cathode and a control electrode, a first time-delay transmission line coupled to said electron-discharge means and responsive to a conductance variation of said electron-discharge means in one sense for applying to said electron-discharge means a first delayed control signal effective to vary the conductance thereof in an opposite sense and complete a cycle of conductance variation, the time delay of said first line being such that said first control signal is delayed with reference to said conductance variation in said one sense by an interval equal to a desired value of one of said characteristic time intervals, a second time-delay transmission line coupled to said electron-discharge means and responsive to a conductance variation of said electron-discharge means for applying to said electron-discharge means a second delayed control signal effective to vary the conductance thereof in said one sense, the time delay of said second line being such that said second control signal is delayed with reference to said first control signal by an interval equal to a desired value of the other of said characteristic time intervals, and means including a condenser connected between said cathode and control electrode for developing a holding voltage for blocking said electron-discharge means in response to a predetermined plurality of said cycles of conductance variation, whereby the conductance of said electron-discharge means is cyclically varied at spaced intervals to generate a predetermined plurality of output pulses having a desired duration and time separation.

15. A generator for generating a plurality of pulses having two characteristic time intervals corresponding respectively to pulse duration and pulse separation comprising, an electron-discharge devise having an anode, a cathode, and a control electrode, means for applying a keying signal to said control electrode to effect a conductance variation of said electron-discharge device in one sense, a first time-delay transmission line coupled to a pair of said electrodes and responsive to said conductance variation in said one sense for applying to said electron-discharge device a first delayed control signal effective to vary the conductance thereof in an opposite sense and complete a cycle of conductance variation, the time delay of said first line being such that said first control signal is delayed with reference to said conductance variation in said one sense by an interval equal to a desired value of one of said characteristic time intervals, and a second time-delay transmission line coupled to a pair of said electrodes and responsive to a conductance variation of said electron-discharge device for applying to said electron-discharge device a second delayed control signal effective to vary the conductance thereof in said one sense, the time delay of said second line being such that said second control signal is delayed with reference to said first control signal by an interval equal to a desired value of the other of said characteristic time intervals, whereby the conductance of said electron-discharge device is cyclically varied at spaced intervals to generate output pulses having a desired duration and time separation.

MARTIN FISCHMAN.

REFERENCES CITED

The following references are of record in the file of this patent:

UNITED STATES PATENTS

| Number | Name | Date |
| --- | --- | --- |
| 2,211,942 | White | Aug. 20, 1940 |
| 2,212,967 | White | Aug. 27, 1940 |
| 2,266,154 | Blumlein | Dec. 16, 1941 |